United States Patent
Li et al.

(10) Patent No.: US 11,543,537 B1
(45) Date of Patent: Jan. 3, 2023

(54) OCEAN CURRENT MEASUREMENT METHOD BASED ON SURFACE DRIFTING BUOY

(71) Applicant: FIRST INSTITUTE OF OCEANOGRAPHY, MINISTRY OF NATURAL RESOURCES, Qingdao (CN)

(72) Inventors: Shujiang Li, Qingdao (CN); Guanhui Liang, Qingdao (CN); Guanlin Wang, Qingdao (CN); Fengye Zhang, Qingdao (CN); Zexun Wei, Qingdao (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 17/702,533

(22) Filed: Mar. 23, 2022

(30) Foreign Application Priority Data

Sep. 16, 2021 (CN) .......................... 202111084002.X

(51) Int. Cl.
*G01S 19/14* (2010.01)
*G01C 13/00* (2006.01)

(52) U.S. Cl.
CPC ............ *G01S 19/14* (2013.01); *G01C 13/002* (2013.01)

(58) Field of Classification Search
CPC ............................... G01S 19/14; G01C 13/002

USPC .............................................................. 702/2
See application file for complete search history.

(56) References Cited

U.S. PATENT DOCUMENTS

2021/0055164 A1* 2/2021 Solheim ................ G01J 5/0816

FOREIGN PATENT DOCUMENTS

| CN | 105253255 A | | 1/2016 |
|---|---|---|---|
| CN | 106501826 A | | 3/2017 |
| CN | 110715648 A | * | 1/2020 |

* cited by examiner

*Primary Examiner* — John H Le
(74) *Attorney, Agent, or Firm* — Oliff PLC

(57) ABSTRACT

An ocean current measurement method, includes: acquiring three-dimensional coordinates measured by four GNSS (Global Navigation Satellite System) positioning modules on the surface drifting buoy and attitude data of the surface drifting buoy measured by an attitude sensor; correcting the three-dimensional coordinates measured by the four GNSS positioning modules based on the attitude data; optimizing the corrected three-dimensional coordinates of the four GNSS positioning modules according to the mounting positions; converting the optimized three-dimensional coordinates of the four GNSS positioning modules into latitude and longitude coordinates; and calculating coordinates of the surface drifting buoy, an instantaneous flow velocity and flow direction of ocean current and sea surface elevation through the latitude and longitude coordinates of the four GNSS positioning modules. The coordinates with higher precision can be obtained, and the flow velocity, flow direction and sea surface elevation of the sea area where the buoy is located can be measured.

3 Claims, 5 Drawing Sheets

OCEAN CURRENT MEASUREMENT METHOD BASED ON SURFACE DRIFTING BUOY

TECHNICAL FIELD

The present invention relates to the field of ocean current observation, and in particular, to an ocean current measurement method based on a surface drifting buoy.

BACKGROUND ART

A surface drifting buoy is a small marine data buoy developed according to the needs of ocean survey, environmental monitoring and scientific experiment, which is mainly used to measure surface current of sea water by using a Lagrange method. The positioning accuracy of the buoy is the main factor affecting current measurement accuracy. At present, the positioning accuracy of the surface drifting buoy is 10 m, which cannot meet high-precision flow measurement requirements at present. In terms of the types of current measurement data, the current surface drifting buoy can only provide average flow velocity measured by the Lagrange method, and cannot provide measurement functions of data such as an instantaneous flow velocity, a flow direction and sea surface elevation, and cannot perform observation with a higher resolution on ocean current fields.

SUMMARY

To solve the technical problems, the present invention provides an ocean current measurement method based on a surface drifting buoy, so as to obtain latitude and longitude coordinates with higher precision, and measure an instantaneous flow velocity, a flow direction and a sea surface elevation of a sea area where the buoy is located.

To achieve the objective, the present invention adopts the following technical solution:

An ocean current measurement method based on a surface drifting buoy includes the following steps:
- step 1, acquiring three-dimensional coordinates respectively measured by four GNSS (Global Navigation Satellite System) positioning modules on the surface drifting buoy and attitude data of the surface drifting buoy measured by an attitude sensor, where antenna phase centers of the four GNSS positioning modules are respectively positioned at four vertexes of a square, the four antenna phase centers are within the same plane, and the plane is vertical to a vertical central axis of the surface drifting buoy;
- step 2, correcting the three-dimensional coordinates respectively measured by the four GNSS positioning modules based on the attitude data of the surface drifting buoy;
- step 3, optimizing the corrected three-dimensional coordinates of the four GNSS positioning modules according to the mounting positions of the four GNSS positioning modules;
- step 4, converting the optimized three-dimensional coordinates of the four GNSS positioning modules into latitude and longitude coordinates; and
- step 5, calculating latitude and longitude coordinates of the surface drifting buoy, an instantaneous flow velocity and a flow direction of ocean current and an instantaneous sea surface elevation through the latitude and longitude coordinates of the four GNSS positioning modules.

In the solution, the correcting formula in step 2 is as follows:

$$X'_k = X_k \cos y \cos p + Y_k (\cos y \sin p \sin r - \sin y \cos r) - Z_k (\cos y \sin p \sin r + \sin y \sin r)$$

$$Y'_k = X_k \sin y \cos p + Y_k (\sin y \sin p \sin r - \cos y \cos r) - Z_k (\sin y \sin p \cos r - \cos y \sin r)$$

$$Z'_k = -X_k \sin p + Y_k \cos p \sin r + Z_k \cos p \cos r$$

$(X_k, Y_k, Z_k)$ are three-dimensional coordinates measured by the k-th GNSS positioning module under an earth centered fixed coordinate system, $(X'_k, Y'_k, Z'_k)$ are corrected three-dimensional coordinates of the k-th GNSS positioning module, k=1, 2, 3, 4, y is a yaw angle of the surface drifting buoy, r is a rolling angle of the surface drifting buoy, and p is a pitch angle of the surface drifting buoy.

In the solution, the optimization method in step 3 is as follows:
(1) constructing a measurement pattern by taking the corrected three-dimensional coordinates of the four GNSS positioning modules as vertexes, and constructing a mounting pattern by taking the mounting positions of the four GNSS positioning modules as vertexes;
(2) judging whether the measurement pattern is a concave quadrilateral, and moving to-be-adjusted vertexes according to positions of the vertexes in the mounting pattern if the measurement pattern is the concave quadrilateral, so that the moved measurement pattern is changed into a convex quadrilateral and includes the mounting pattern;
(3) respectively calculating motion vectors of the four vertexes in the measurement pattern according to the positions of the vertexes in the mounting pattern, verifying a length difference before and after four sides of the quadrilateral move and an angle difference before and after four corners of the quadrilateral move, and ending optimization if a difference value is within a set threshold range; and
(4) respectively moving the four vertexes according to the calculated motion vectors, so that the moved measurement pattern is the same with the mounting pattern in size and shape.

In the solution, the conversion method in step 4 is as follows:

$$B_k = \tan^{-1} \frac{Y''_k}{X''_k}$$

$$L_k = \tan^{-1} \left[ \frac{Z''_k}{\sqrt{X''^2_k + Y''^2_k}} - \left(1 - \frac{a^2 - b^2}{a^2} \cdot \frac{a^2}{a^2 + H_k \sqrt{a^2 - (a^2 - b^2)(\sin L_k)^2}} \right)^{-1} \right]$$

$$H_k = \frac{\sqrt{X''^2_k + Y''^2_k}}{\cos L_k} - \frac{a^2}{\sqrt{a^2 - (a^2 - b^2)(\sin L_k)^2}}$$

$B_k$ is a latitude of the k-th GNSS positioning module, $L_k$ is a longitude of the k-th GNSS positioning module, $H_k$ is geodetic height of the k-th GNSS positioning module, $(X''_k, Y''_k, Z''_k)$ are optimized three-dimensional coordinates of the k-th GNSS positioning module, a is an earth major radius and b is an earth minor radius;

and the converted latitude and longitude coordinates of the four GNSS positioning modules are obtained by solving the equations through an iterative operation method.

In the solution, the specific method in step 5 is as follows:

The surface drifting buoy is shut on once every 15 minutes, the surface drifting buoy is shut off after latitude and longitude data which are acquired within 30 second are calculated, where a sequence length of the acquired data is 300, latitude and longitude sequences acquired by the four GNSS positioning modules are respectively ($B_{ki}$, $L_{ki}$, $H_{ki}$), k is a serial number of the four GNSS positioning modules, k=1, 2, 3, 4, i=1, 2, 3, . . .,300; $B_{ki}$ is a latitude sequence of a k-th GNSS positioning module, $L_{ki}$ is a longitude sequence of the k-th GNSS positioning module, and $H_{ki}$ is a geodetic height sequence of the k-th GNSS positioning module;

(1) the latitude and the longitude of the surface drifting buoy are calculated:

gross error elimination is respectively performed on a longitude sequence of the four GNSS positioning modules, and an arithmetic mean value of all longitudes measured by the four GNSS positioning modules is calculated as a longitude of the surface drifting buoy within the working period; and gross error elimination is respectively performed on a latitude sequence of the four GNSS positioning modules, and an arithmetic mean value of all latitudes measured by the four GNSS positioning modules is calculated as a latitude of the surface drifting buoy within the working period;

(2) the flow velocity and the flow direction of the surface drifting buoy are calculated:

a north flow velocity $V_N$ of the surface drifting buoy is firstly calculated through displacement in a latitude direction, where a calculating formula for the north flow velocity of each GNSS positioning module is as follows:

$$V_{Nki}=M\times(B_{ki+1}-B_{ki})\div t$$

$V_{Nki}$ is the i-th northern velocity calculated by the k-th GNSS positioning module, i=1, 2, 3. . . 299, $B_{ki}$ is the i-th latitude measured by the k-th GNSS positioning module, M is a ground moving distance coefficient, and t is time;

gross error elimination is respectively performed on a north velocity sequence of the four GNSS positioning modules, and an arithmetic mean value of all north velocities $V_{Nki}$, measured by the four GNSS positioning modules is calculated as a north velocity $V_N$ of the surface drifting buoy within the working period;

then, an east flow velocity $V_E$ of the surface drifting buoy is calculated through displacement in a longitude direction, where a calculating formula for the east flow velocity of each GNSS positioning module is as follows:

$$V_{Eki}=M\times(L_{ki+1}-L_{ki})\cos B_{ki}\div t$$

$V_{Eki}$ is the i-th east velocity calculated by the k-th GNSS positioning module, i=1, 2, 3. . . 299, and $L_{ki}$ is the i-th longitude measured by the k-th GNSS positioning module;

gross error elimination is respectively performed on an east velocity sequence of the four GNSS positioning modules, and an arithmetic mean value of all east velocities $V_{Eki}$ measured by the four GNSS positioning modules is calculated as an east velocity $V_E$ of the surface drifting buoy within the working period;

and finally, a calculating formula of the flow velocity V of a sea area where the surface drifting buoy is as follows:

$$V=\sqrt{V_N^2+V_E^2}$$

and a calculating formula of a flow direction D is as follows:

$$D=\tan^{-1}\frac{V_N}{V_E}$$

(3) the instantaneous sea surface elevation is calculated:

gross error elimination is respectively performed on a geodetic height sequence of the four GNSS positioning modules, and an arithmetic mean value of geodetic heights measured by the four GNSS positioning modules is calculated as an geodetic height of the surface drifting buoy within the working period; and a distance from antenna phase centers of the GNSS positioning modules to a water line of the surface drifting buoy is subtracted to obtain the instantaneous sea surface elevation of the sea area where the surface drifting buoy is located.

According to the technical solution, the ocean current measurement method based on the surface drifting buoy provided in the present invention has the following beneficial effects:

The present invention can overcome the defect that the current surface drifting buoy is only equipped with one GNSS antenna for coordinate measurement; and according to the solution of mounting the four GNSS positioning modules and the attitude sensor, precise longitude and latitude coordinates, the elevation under a CGCS2000 coordinate system, north, east and vertical velocities under a navigation coordinate system of the sea area where the surface drifting buoy is located can be obtained, and an update rate of the data is 10 Hz. The positioning precision of the surface drifting buoy in the present invention is superior to 0.6 m, the average flow velocity and the flow direction can be measured by the Lagrange method, and the instantaneous flow velocity, the flow direction and the sea surface elevation of the sea area where the surface drifting buoy is located also can be measured.

BRIEF DESCRIPTION OF DRAWINGS

In order to illustrate the embodiments of the present invention or the technical solutions in the prior art more clearly, the following will briefly introduce the drawings that need to be used in the description of the embodiments or the prior art.

In the figures: 1, buoy shell; 2, cable; 3, water sail; 4, supporting rod; 5, automatic meteorological station; 6, four GNSS positioning modules; A, first GNSS positioning module; B, second GNSS positioning module; C, third GNSS positioning module; D, fourth GNSS positioning module; 7, attitude sensor; 8, water temperature sensor; 9, embedded type processing module; 10, iridium communication module; 11, solar panel; 12, solar charging controller; 13, lead storage battery; and 14, plane mounting plate.

DETAILED DESCRIPTION OF THE EMBODIMENTS

The technical solutions in the embodiments of the present invention will be described clearly and completely in combination with the drawings in the embodiments of the present invention.

Figure 1:
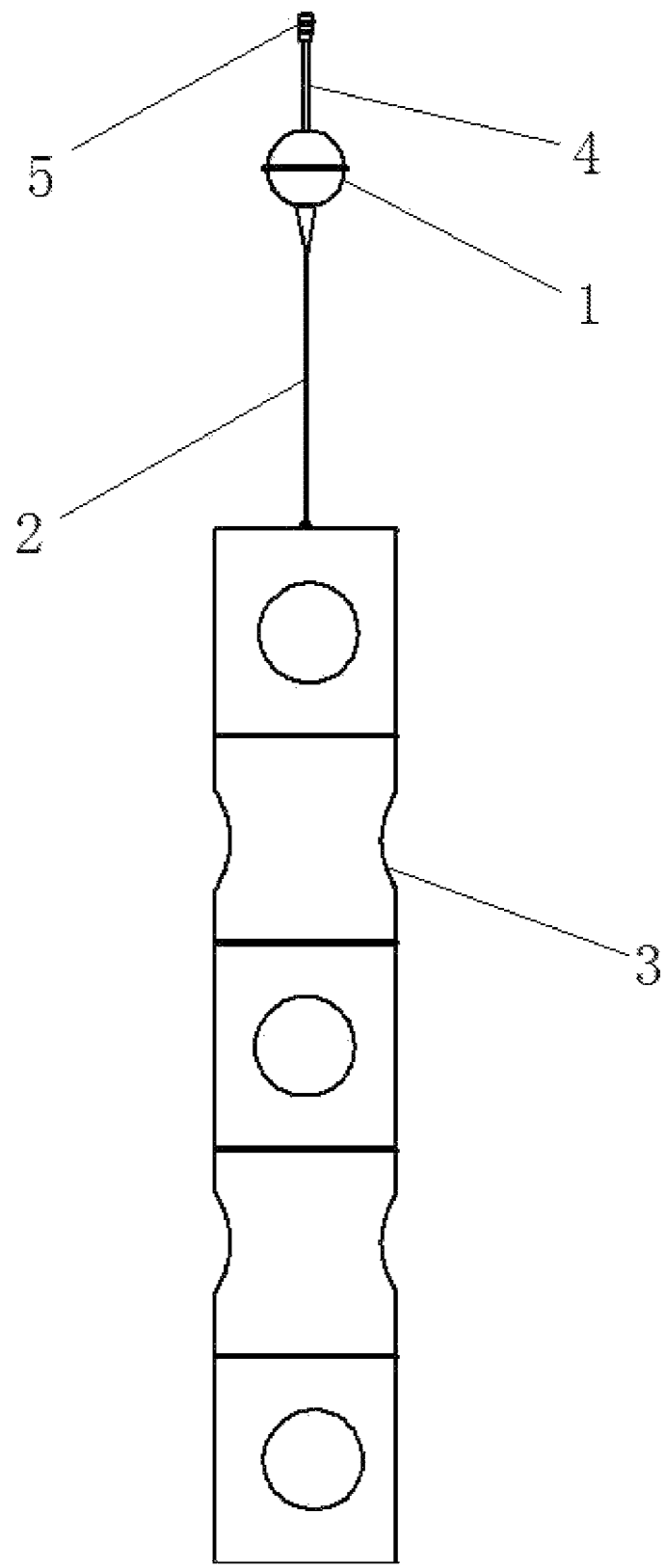
FIG. 1 is an overall schematic diagram of a surface drifting buoy disclosed in an embodiment of the present invention.
Figure 2:
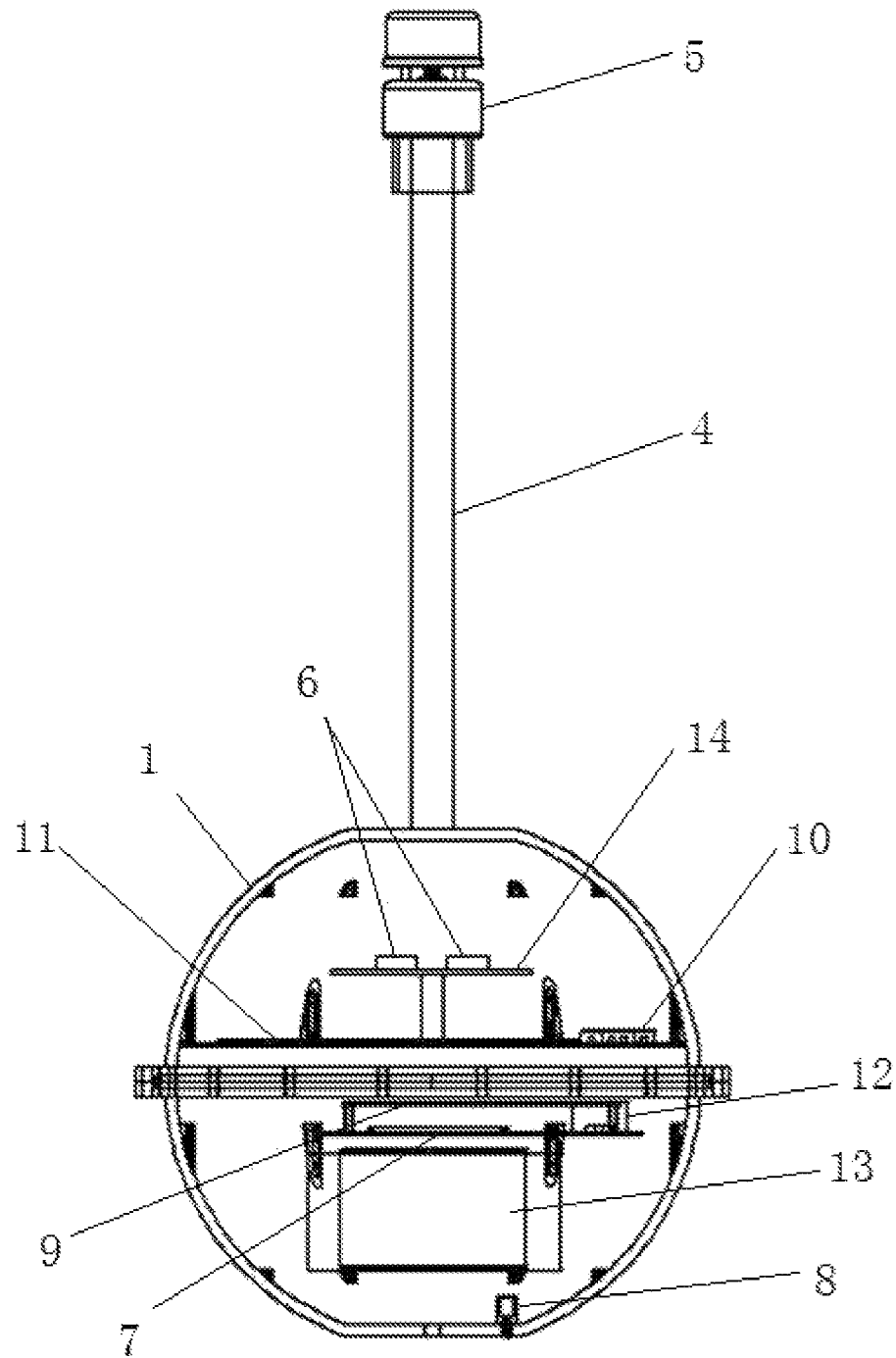
FIG. 2 is a schematic diagram of the interior of a buoy shell disclosed in an embodiment of the present invention.

As shown in FIG. 1, the surface floating buoy in the present invention consists of a buoy shell 1, a water sail 3 which is connected to the bottom of the buoy shell 1 through a cable 2, and an automatic meteorological station 5 which is connected to the top of the buoy shell 1 through a supporting rod 4. As shown in FIG. 2, four GNSS positioning modules 6, an attitude sensor 7, a water temperature sensor 8, an embedded type processing module 9, an iridium communication module 10, a solar panel 11, a solar charging controller 12 and a lead storage battery 13 are arranged inside the buoy shell 1. The supporting rod 4 adopts a carbon fiber structure, is internally hollow, and is internally provided with a serial port connecting line between the automatic meteorological station 5 and the embedded type processing module 9. Four GNSS positioning modules 6 are mounted on the upper half part of the surface drifting buoy through the plane mounting plate 14; the automatic meteorological station 5 and the supporting rod 4 are only arranged in a zenith direction of the surface drifting buoy; the four GNSS positioning modules 6 are connected to the embedded type processing module 9 through serial ports; the iridium communication module 10 is mounted on the side surface of the plane mounting plate 14, and is connected to the embedded type processing module 9 through a serial port; the water temperature sensor 8 is mounted on the bottom of the surface drifting buoy, and output thereof is accessed to an A/D acquisition port of the embedded type processing module 9; the solar panel 11 is mounted at a joint of upper and lower parts of the surface drifting buoy, so that the area of the solar panel 11 is guaranteed to be the biggest; and the lead storage battery 13 and the solar charging controller 12 are mounted on the lower half part of the surface drifting buoy.

Figure 3:
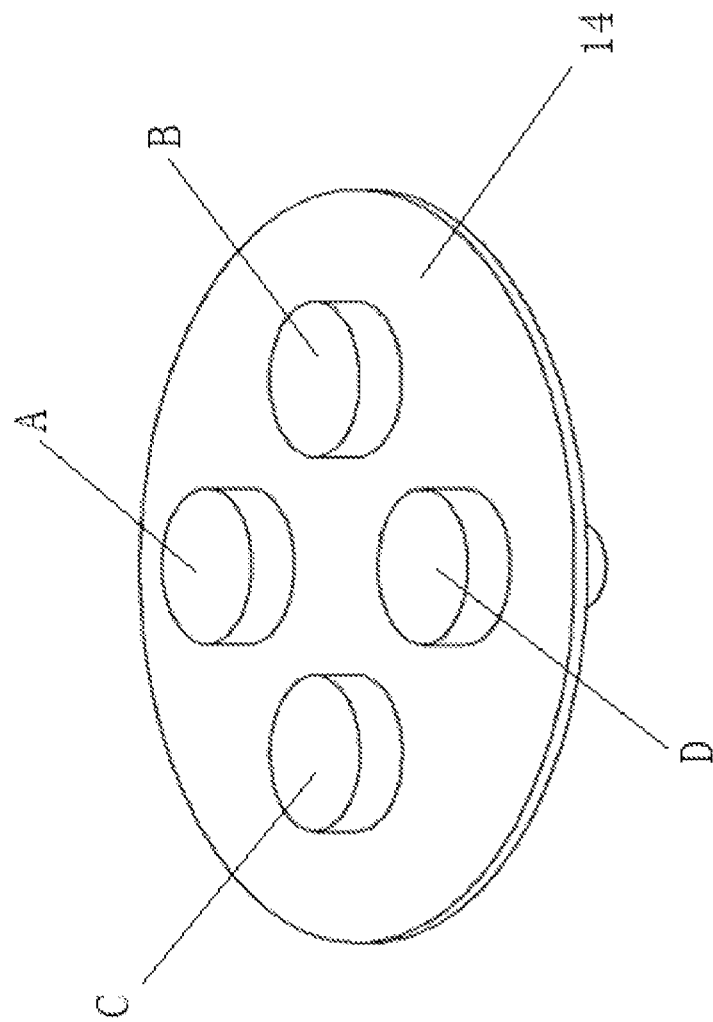
FIG. 3 is a mounting schematic diagram of four GNSS positioning modules disclosed in an embodiment of the present invention.

As shown in FIG. 3, antenna phase centers of the four GNSS positioning modules 6 are respectively positioned at four vertexes of a square, the four antenna phase centers are within the same plane, and the plane is vertical to a vertical central axis of the surface drifting buoy. Length of four connecting lines between adjacent GNSS positioning modules is fixed, and included angles of the four connecting lines between adjacent GNSS positioning modules are 90 degrees.

The present invention provides an ocean current measurement method based on a surface drifting buoy, including the following steps:

step 1, three-dimensional coordinates respectively measured by four GNSS (Global Navigation Satellite System) positioning modules 6 on the surface drifting buoy and attitude data of the surface drifting buoy measured by an attitude sensor 7 are obtained;

under an earth centered fixed coordinate system, three-dimensional coordinates measured by the first GNSS positioning module are $(X_1, Y_1, Z_1)$, three-dimensional coordinates measured by the second GNSS positioning module are $(X_2, Y_2, Z_2)$, three-dimensional coordinates measured by the third GNSS positioning module are $(X_3, Y_3, Z_3)$, and three-dimensional coordinates measured by the fourth GNSS positioning module are $(X_4, Y_4, Z_4)$. Data measured by the attitude sensor 7 are (y, r, p), where y is a yaw angle of the surface drifting buoy, r is a rolling angle of the surface drifting buoy, and p is a pitch angle of the surface drifting buoy.

step 2, the three-dimensional coordinates respectively measured by the four GNSS positioning modules 6 based on the attitude data of the surface drifting buoy are connected; the correcting formula is as follows:

$$X'_k = X_k \cos y \cos p + Y_k(\cos y \sin p \sin r - \sin y \cos r) + Z_k(\cos y \sin p \sin r + \sin y \sin r)$$

$$Y'_k = X_k \sin y \cos p + Y_k(\sin y \sin p \sin r + \cos y \cos r) + Z_k(\sin y \sin p \cos r - \cos y \sin r)$$

$$Z'_k = -X_k \sin p + Y_k \cos p \sin r + Z_k \cos p \cos r$$

Figure 4:
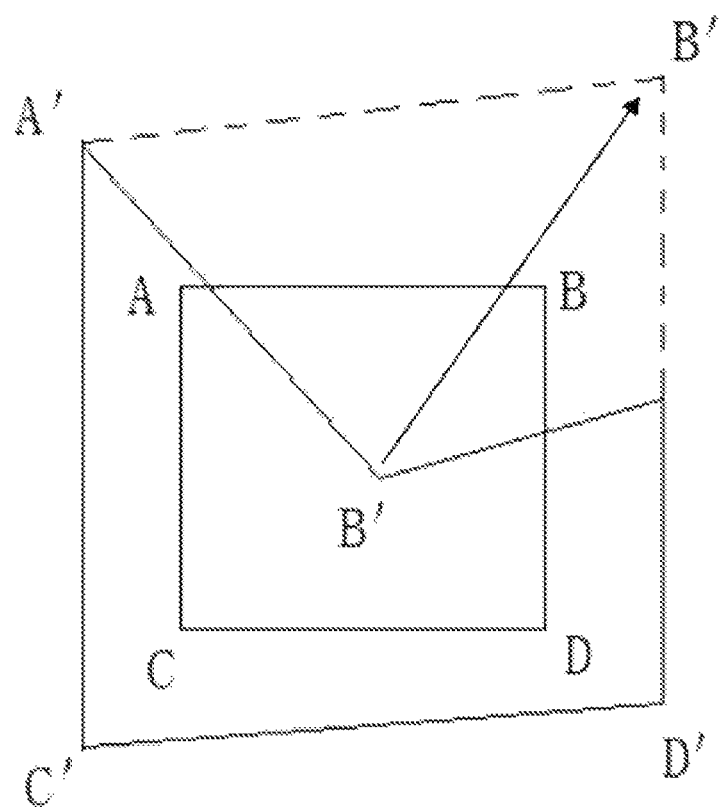
FIG. 4 is a schematic diagram showing an optimization process for four GNSS positioning modules (changing concave quadrilaterals into convex quadrilaterals)
Figure 5:
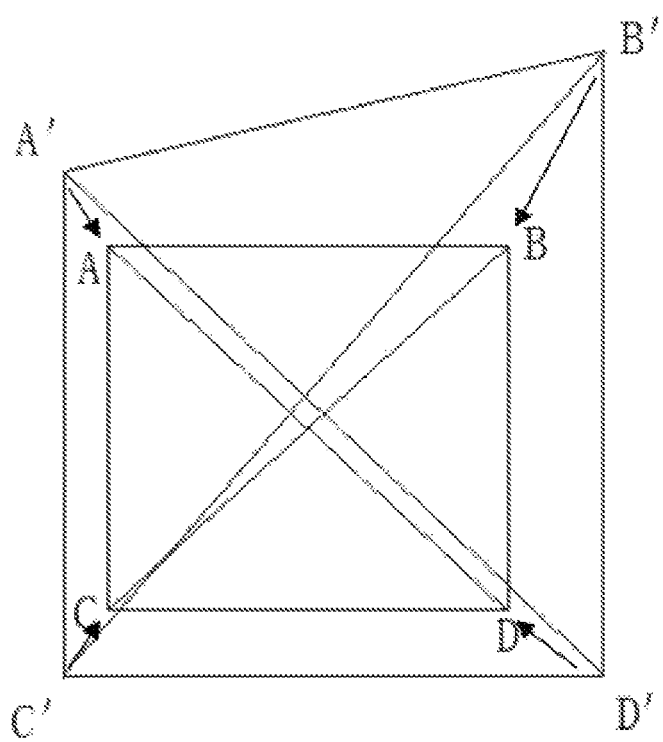
FIG. 5 is a schematic diagram showing an optimization process for four GNSS positioning modules (convex quadrilaterals).

$(X_k, Y_k, Z_k)$ are three-dimensional coordinates measured by the k-th GNSS positioning module under earth centered fixed coordinate system, $(X'_k, Y'_k, Z'_k)$ are corrected three-dimensional coordinates of the k-th GNSS positioning module, k=1,2,3, 4; y is a yaw angle of the surface drifting buoy, r is a rolling angle of the surface drifting buoy, and p is a pitch angle of the surface drifting buoy;

after attitude correction, the three-dimensional coordinates measured by the first GNSS positioning module are $(X'_1, Y'_1, Z'_1)$, the three-dimensional coordinates measured by the second GNSS positioning module are $(X'_2, Y'_2, Z'_2)$, the three-dimensional coordinates measured by the third GNSS positioning module are $(X'_3, Y'_3, Z'_3)$, and the three-dimensional coordinates measured by the fourth GNSS positioning module are $(X'_4, Y'_4, Z'_4)$;

step 3, the corrected three-dimensional coordinates of the four GNSS positioning modules 6 are optimized according to the mounting positions of the four GNSS positioning modules 6;

As shown in FIG. 5, the optimization method is as follows:

(1) the measurement pattern is constructed by taking the corrected three-dimensional coordinates of the four GNSS positioning modules 6 as vertexes, A', B', C', D' are coordinate positions measured by the first, the second, the third and the fourth GNSS positioning modules; in addition, the mounting pattern is constructed by taking vertexes of the mounting positions of the four GNSS positioning modules 6, and A, B, C and D are mounting positions of the first, the second, the third and the fourth GNSS positioning module;

(2) whether the measurement pattern A', B', C', D' is a concave quadrilateral is judged, if the measurement pattern is the concave quadrilateral, as shown in FIG. 4, to-be-adjusted vertexes B' are moved according to positions of the vertexes in the mounting pattern, so that the moved measurement pattern is changed into a convex quadrilateral and includes the mounting pattern; measurement coordinates of one GNSS positioning module are moved in the step, and the moved measurement pattern is greater than the mounting pattern;

(3) motion vectors of the four vertexes in the measurement pattern are respectively calculated according to the positions of the vertexes in the mounting pattern, a length difference before and after four sides of the quadrilateral move and an angle difference before and after four corners of the quadrilateral move are verified, and optimization is ended if a difference value is within a set threshold range;

taking the first GNSS positioning module as an example, the calculating method is follows: a motion vector of a point A' is calculated according to a length difference value between a line segment AD and a line segment A'D', a ratio of an angle B'A'C' to an angle B'D'C', and a ratio of an angle B'A'D' to an angle C'A'D';

after motion vectors of the four GNSS positioning modules 6 are calculated in sequence, calculated results are verified as follows: length difference values between the line segment A'B' and AB, the line segment B'D' and BD, the line segment C'D' and CD, and the line segment C'A' and CA are compared, and difference values between an angle B'A'C', an angle B'D'C', an angle A'B'D', an angle A'C'D' and 90 degrees are respectively compared; if the length difference values are smaller than 5% of absolute length, the angle difference values are smaller than 3 degrees, and the optimization process can be considered to be ended;

(4) the four vertexes are moved respectively according to the calculated motion vectors, so that the moved measurement pattern is the same with the mounting pattern in size and shape;

step 4, the optimized three-dimensional coordinates of the four GNSS positioning modules 6 are converted into latitude and longitude coordinates;

the conversion method is as follows:

$$B_k = \tan^{-1} \frac{Y_k''}{X_k''}$$

$$L_k = \tan^{-1}\left[\frac{Z_k''}{\sqrt{X_k''^2 + Y_k''^2}} - \left(1 - \frac{a^2 - b^2}{a^2} \frac{a^2}{a^2 + H_k\sqrt{a^2 - (a^2 - b^2)(\sin L_k)^2}}\right)^{-1}\right]$$

$$H_k = \frac{\sqrt{X_k''^2 + Y_k''^2}}{\cos L_k} - \frac{a^2}{\sqrt{a^2 - (a^2 - b^2)(\sin L_k)^2}}$$

$B_k$ is a latitude of the k-th GNSS positioning module, $L_k$ is a longitude of the k-th GNSS positioning module, $H_k$ is geodetic height of the k-th GNSS positioning module, ($X''_k$, $Y''_k$, $Z''_k$) are optimized three-dimensional coordinates of the k-th GNSS positioning module, a is an earth major radius and b is an earth minor radius;

and the converted latitude and longitude coordinates of the four GNSS positioning modules are obtained by solving the equations through an iterative operation method;

step 5, latitude and longitude coordinates of the surface drifting buoy, an instantaneous flow velocity and a flow direction of ocean current and an instantaneous sea surface elevation are calculated through the latitude and longitude coordinates of the four GNSS positioning modules 6.

The specific method is as follows:

The surface drifting buoy is shut on once every 15 minutes, the surface drifting buoy is shut off after latitude and longitude data which are acquired within 30 seconds are calculated, where a sequence length of the acquired data is 300(30 s*10 Hz), a latitude and longitude sequence acquired by the four GNSS positioning modules 6 is respectively ($B_{ki}$, $L_{ki}$, $H_{ki}$); k is a serial number of the four GNSS positioning modules 6, k=1,2,3,4, i=1,2,3, . . ., 300; $B_{ki}$ is a latitude sequence of a k-th GNSS positioning module, $L_{ki}$ is a longitude sequence of the k-th GNSS positioning module, and $_{Hki}$ is a geodetic height sequence of the k-th GNSS positioning module;

(1) the latitude and the longitude of the surface drifting buoy is calculated:

gross error elimination is respectively performed on a longitude sequence of the four GNSS positioning modules, and an arithmetic mean value of all longitudes measured by the four GNSS positioning modules is calculated as a longitude of the surface drifting buoy within the working period;

gross error elimination is respectively performed on a latitude sequence of the four GNSS positioning modules, and an arithmetic mean value of all latitudes measured by the four GNSS positioning modules is calculated as a latitude of the surface drifting buoy within the working period.

(2) the flow velocity and the flow direction of the surface drifting buoy are calculated:

firstly, a north flow velocity $V_N$ of the surface drifting buoy is calculated through displacement in a latitude direction, where a calculating formula for the north flow velocity of each GNSS positioning module is as follows:

$$V_{Nki}=M\times(B_{ki+1}-B_{ki})\div t$$

$V_{Nki}$ is the i-th northern velocity calculated by the k-th GNSS positioning module, i=1,2,3. . . 299, $B_{ki}$ is the i-th latitude measured by the k-th GNSS positioning module, M is a ground moving distance coefficient M=111319.491, and t is time, t=0.1 s;

after gross error elimination is respectively performed on a north velocity sequence of the four GNSS positioning modules 6, and an arithmetic mean value of all north velocities V measured by the four GNSS positioning modules 6 is calculated as a north velocity $V_N$ of the surface drifting buoy within the working period;

then, an east flow velocity $V_E$ of the surface drifting buoy is calculated through displacement in a longitude direction, where a calculating formula for the east flow velocity of each GNSS positioning module is as follows:

$$V_{Eki}=M\times(L_{ki+1}-L_{ki})\cos B_{ki}\div t$$

$V_{Eki}$ is the i-th northern velocity calculated by the k-th GNSS positioning module, i=1, 2, 3. . . 299, $L_{ki}$ is the i-th longitude measured by the k-th GNSS positioning module, M is a ground moving distance coefficient, M=111319.491, and t is time, t=0.1 s;

after gross error elimination is respectively performed on an east velocity sequence of the four GNSS positioning modules 6, and an arithmetic mean value of all east velocity $V_{Eki}$ measured by the four GNSS positioning modules 6 is calculated as an east velocity $V_E$ of the surface drifting buoy within the working period;

and finally, a calculating formula of the flow velocity V of a sea area where the surface drifting buoy is located is as follows:

$$V=\sqrt{V_N^2+V_E^2}$$

and a calculating formula of a flow direction D is as follows:

$$D = \tan^{-1}\frac{V_N}{V_E}$$

(3) the instantaneous sea surface elevation is calculated:

after gross error elimination is respectively performed on a geodetic height sequence of the four GNSS positioning modules 6, an arithmetic mean value of geodetic heights measured by the four GNSS positioning modules 6 is calculated as an geodetic height of the surface drifting buoy within the working period; and then a distance from antenna phase centers of the GNSS positioning modules to a water line of the surface drifting buoy is subtracted so as to obtain the instantaneous sea surface elevation of the sea area where the surface drifting buoy is located.

The gross error elimination process includes two operations with different algorithms, so that the purpose of guaranteeing data preprocessing is achieved.

The first operation includes the following steps:
step 1, an arithmetic mean value of the data sequences within this segment is calculated;
step 2, a standard deviation of the data sequences within this segment is calculated;
step 3, a tag value of each datum in the data sequences within this segment is calculated; and
step 4, the tag value of each datum is compared with a critical value which is 3.34 according to data bulb per minute; and if the tag value is greater than the critical value, the datum is eliminated, otherwise, the datum is retained.

The second operation includes the following steps:
step 1, the data within the segment are arranged from small to small;
step 2, the tag value of each datum is calculated;
step 3, the tag value of the first datum is compared with the critical value; the first datum is eliminated and re-sequenced if the tag value is greater than the critical value; and if the tag value is smaller than the critical value, the first datum is retained and the tag value of each datum is continuously calculated;
step 4, the tag value of each datum is compared with the critical value; the datum is eliminated and re-sequenced if the tag value is greater than the critical value; and if the tag value is smaller than the critical value, the datum is retained.

The description of the disclosed embodiments enables a person skilled in the art to implement or use the present invention. Various modifications to the embodiments will be obvious to a person skilled in the art, and the general principle defined herein can be implemented in other embodiments without departing from the spirit or scope of the present invention. Therefore, the present invention will not be limited to the embodiments herein, but should conform to the widest scope consistent with the principles and novel features disclosed herein.

The invention claimed is:

1. An ocean current measurement method based on a surface drifting buoy, comprising the following steps:
step 1, acquiring three-dimensional coordinates respectively measured by four GNSS (Global Navigation Satellite System) positioning modules on the surface drifting buoy and attitude data of the surface drifting buoy measured by an attitude sensor, wherein antenna phase centers of the four GNSS positioning modules are respectively positioned at four vertexes of a square, the four antenna phase centers are within the same plane, and the plane is vertical to a vertical central axis of the surface drifting buoy;
step 2, correcting the three-dimensional coordinates respectively measured by the four GNSS positioning modules based on the attitude data of the surface drifting buoy;
step 3, optimizing the corrected three-dimensional coordinates of the four GNSS positioning modules according to the mounting positions of the four GNSS positioning modules;
step 4, converting the optimized three-dimensional coordinates of the four GNSS positioning modules into latitude and longitude coordinates; and
step 5, calculating an instantaneous flow velocity and a flow direction of ocean current through the latitude and longitude coordinates of the four GNSS positioning modules;

an optimized method of step 3 is as follows:
(1) constructing a measurement pattern by taking the corrected three-dimensional coordinates of the four GNSS positioning modules as vertexes, and constructing a mounting pattern by taking the mounting positions of the four GNSS positioning modules as vertexes;
(2) judging whether the measurement pattern is a concave quadrilateral, and moving to-be-adjusted vertexes according to positions of the vertexes in the mounting pattern, so that the moved measurement pattern is changed into a convex quadrilateral and comprises the mounting pattern;
(3) respectively calculating motion vectors of the four vertexes in the measurement pattern according to the positions of the vertexes in the mounting pattern, verifying a length difference before and after four sides of the quadrilateral move and an angle difference before and after four corners of the quadrilateral move, and ending optimization if a difference value is within a set threshold range; and
(4) respectively moving the four vertexes according to the calculated motion vectors, so that the moved measurement pattern is the same with the mounting pattern in size and shape; and the specific method of step 5 is as follows:
the surface drifting buoy is shut on once every 15 minutes, the surface drifting buoy is shut off after latitude and longitude data which are acquired within 30 second are calculated, where a sequence length of the acquired data is 300, latitude and longitude sequences acquired by the four GNSS positioning modules are respectively ($B_{ki}$, $L_{ki}$, $H_{ki}$), k is a serial number of the four GNSS positioning modules, k=1,2,3,4, i=1,2,3, . . ., 300; $B_{ki}$ is a latitude sequence of a k-th GNSS positioning module, $L_{ki}$ is a longitude sequence of the k-th GNSS positioning module, and $H_{ki}$ is a geodetic height sequence of the k-th GNSS positioning module;

calculating the flow velocity and the flow direction:
firstly, calculating a north flow velocity $V_N$ of the surface drifting buoy through displacement in a latitude direction, wherein a calculating formula for the north flow velocity of each GNSS positioning module is as follows:

$$V_{Nki}=M\times(B_{ki+1}-B_{ki})\div t$$

$V_{Nki}$ is the i-th northern velocity calculated by the k-th GNSS positioning module, i=1,2,3. . . 299, $B_{ki}$ is the i-th latitude measured by the k-th GNSS positioning module, M is a ground moving distance coefficient, and t is time;

respectively performing gross error elimination on a north velocity sequence of the four GNSS positioning modules, and calculating an arithmetic mean value of all north velocities $V_{Nki}$ measured by the four GNSS positioning modules as a north velocity $V_N$ of the surface drifting buoy within a data acquisition time period during this shut-on;

then, calculating east flow velocity $V_E$ of the surface drifting buoy through displacement in a longitude direction, wherein a calculating formula for the east flow velocity of each GNSS positioning module is as follows:

$$V_{Eki}=M\times(L_{ki+1}-L_{ki})\cos B_{ki}\div t$$

$V_{Eki}$ is the i-th east velocity calculated by the k-th GNSS positioning module, i=1,2,3...299, and $L_{ki}$, is the i-th longitude measured by the k-th GNSS positioning module;

respectively performing gross error elimination on east velocity sequences of the four GNSS positioning modules, and calculating an arithmetic mean value of all east velocities $V_{Eki}$ measured by the four GNSS positioning modules as an east velocity $V_E$ of the surface drifting buoy within a data acquisition time period during this shut-on;

and finally, calculating according to a calculating formula of the flow velocity V of a sea area where the surface drifting buoy is located as follows:

$$V=\sqrt{V_N^2+V_E^2}$$

and a calculating formula of a flow direction D as follows:

$$D = \tan^{-1}\frac{V_N}{V_E}.$$

2. The ocean current measurement method based on the surface drifting buoy according to claim 1, wherein a correcting formula in step 2 is as follows:

$$X'_k=X_k\cos y\cos p+Y_k(\cos y\sin p\sin r-\sin y\cos r)-Z_k(\cos y\sin p\sin r+\sin y\sin r)$$

$$Y'_k=X_k\sin y\cos p+Y_k(\sin y\sin p\sin r-\cos y\cos r)-Z_k(\sin y\sin p\cos r-\cos y\sin r)$$

$$Z'_k=-X_k\sin p+Y_k\cos p\sin r+Z_k\cos p\cos r$$

$(X_k, Y_k, Z_k)$ are three-dimensional coordinates measured by the k-th GNSS positioning module under an earth centered fixed coordinate system, $(X'_k, Y'_k, Z'_k)$ are corrected three-dimensional coordinates of the k-th GNSS positioning module, k=1,2,3,4, y is a yaw angle of the surface drifting buoy, r is a rolling angle of the surface drifting buoy, and p is a pitch angle of the surface drifting buoy.

3. The ocean current measurement method based on the surface drifting buoy according to claim 1, wherein the conversion method in step 4 is as follows:

$$B_k = \tan^{-1}\frac{Y''_k}{X''_k}$$

$$L_k = \tan^{-1}\left[\frac{Z''_k}{\sqrt{X''^2_k + Y''^2_k}} - \left(1 - \frac{a^2-b^2}{a^2}\frac{a^2}{a^2+H_k\sqrt{a^2-(a^2-b^2)(\sin L_k)^2}}\right)^{-1}\right]$$

$$H_k = \frac{\sqrt{X''^2_k + Y''^2_k}}{\cos L_k} - \frac{a^2}{\sqrt{a^2-(a^2-b^2)(\sin L_k)^2}}$$

$B_k$ is a latitude of the k-th GNSS positioning module, $L_k$ is a longitude of the k-th GNSS positioning module, $H_k$ is geodetic height of the k-th GNSS positioning module, $(X''_k, Y''_k, Z''_k)$ are optimized three-dimensional coordinates of the k-th GNSS positioning module, a is an earth major radius and b is an earth minor radius; and the converted latitude and longitude coordinates of the four GNSS positioning modules are obtained by solving the equations through an iterative operation method.

* * * * *